(12) United States Patent
Guerlin

(10) Patent No.: US 6,259,934 B1
(45) Date of Patent: Jul. 10, 2001

(54) RADIO COMMUNICATION DEVICE PROGRAMMED FOR AUTOMATIC ENTRY OF DIRECTORY DATA

(75) Inventor: Jean-Pierre Guerlin, Le Plessis Bouchard (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/324,049

(22) Filed: Jun. 2, 1999

(30) Foreign Application Priority Data

Jun. 8, 1998 (FR) ................................. 98 07 164

(51) Int. Cl.[7] ........................................ H04Q 7/22
(52) U.S. Cl. ......................... 455/566; 455/412; 455/466
(58) Field of Search ............................... 455/412, 414, 455/425, 426, 66, 67.4, 74, 575, 466, 566, 403; 379/88.07, 88.08, 88.11, 88.12, 88.22, 88.25, 93.173, 354

(56) References Cited

U.S. PATENT DOCUMENTS

| | | | |
|---|---|---|---|
| 5,687,216 | * 11/1997 | Svensson | 379/58 |
| 5,737,394 | * 4/1998 | Anderson et al. | 379/88 |
| 5,969,698 | * 10/1999 | Richard et al. | 345/7 |
| 6,035,189 | * 3/2000 | Ali-Vehmas et al. | 455/414 |
| 6,055,442 | * 4/2000 | Rosecrans et al. | 379/355 |

FOREIGN PATENT DOCUMENTS

| | | |
|---|---|---|
| 0 378 775 A2 | 7/1990 | (EP) . |
| WO 97/04580 | 2/1997 | (WO) . |

* cited by examiner

*Primary Examiner*—William Trost
*Assistant Examiner*—Conguan Tran
(74) *Attorney, Agent, or Firm*—Sughrue, Mion, Zinn, Macpeak & Seas, PLLC

(57) ABSTRACT

A radio communication device comprises a display screen, a keypad with keys, a first memory adapted to store temporarily a succession of characters received by radio and a processor programmed to work with the keys of the keypad, the first memory and the display screen in order to display on the screen said succession of characters received by radio. The processor is additionally programmed to respond to pressing at least one key by advancing from an on-screen display of the succession of characters stored in said first memory to an on-screen display for entry of data to be stored in structured form in a second memory, said data entry screen showing said succession of characters stored in said first memory to enable processing of at least a portion of that succession of characters as data to be stored in structured form in the second memory.

8 Claims, 3 Drawing Sheets

FIG_1
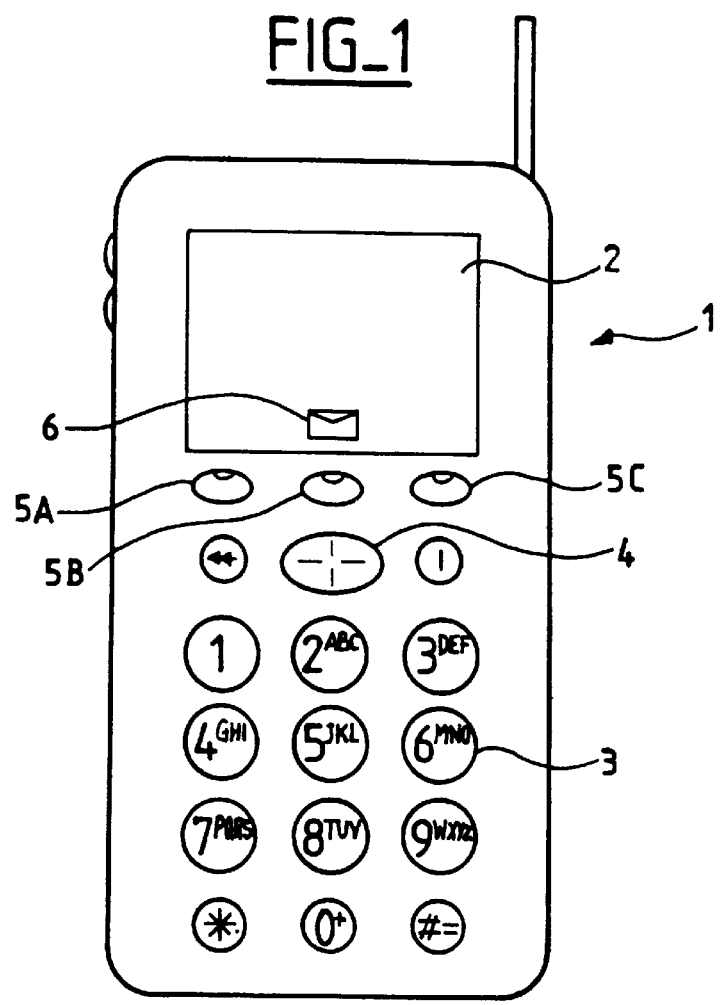
FIG_2
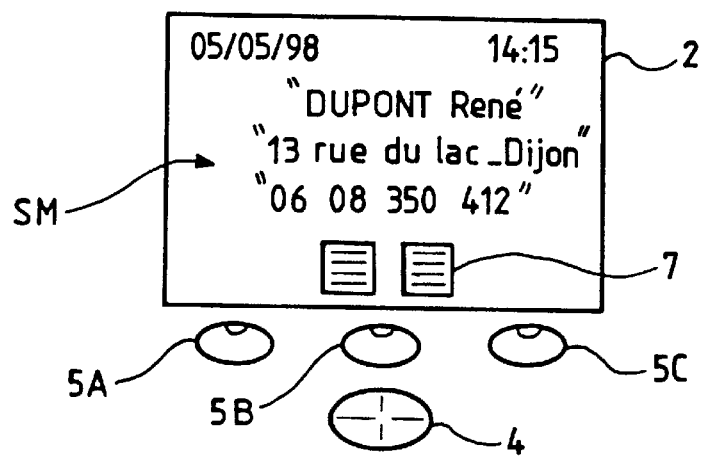

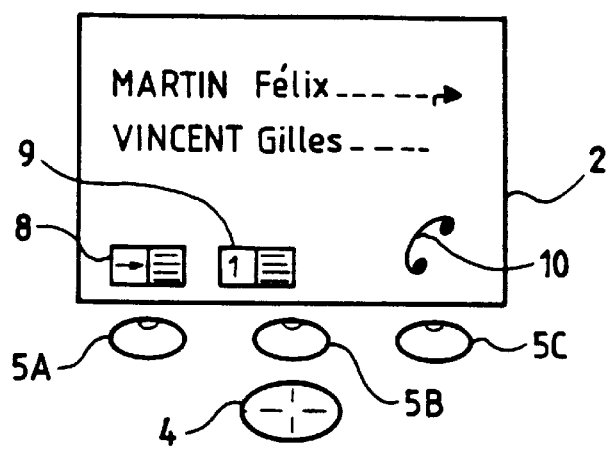
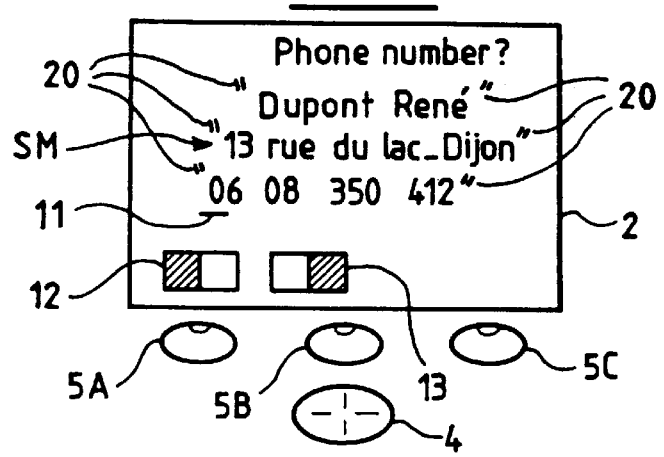
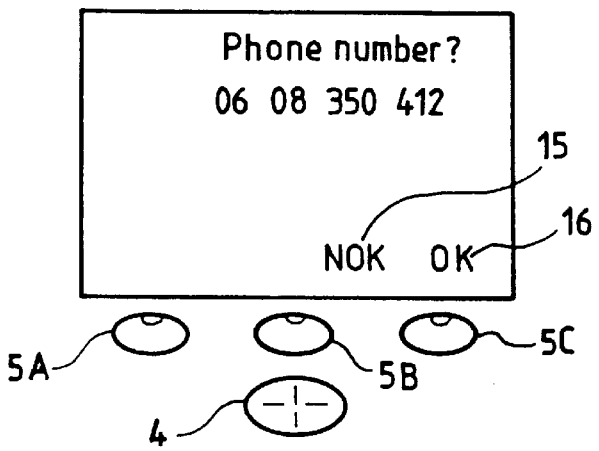

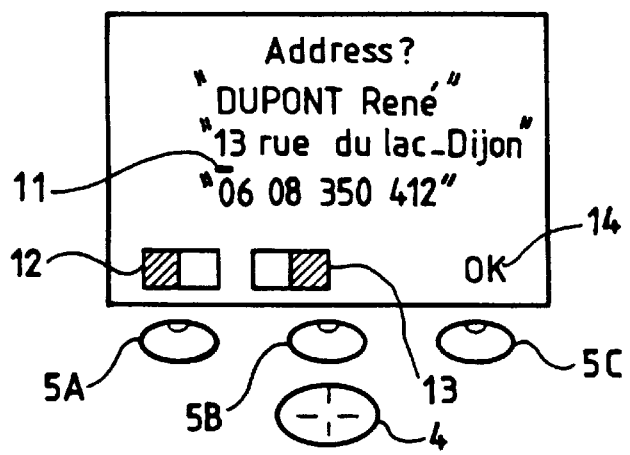
FIG_6
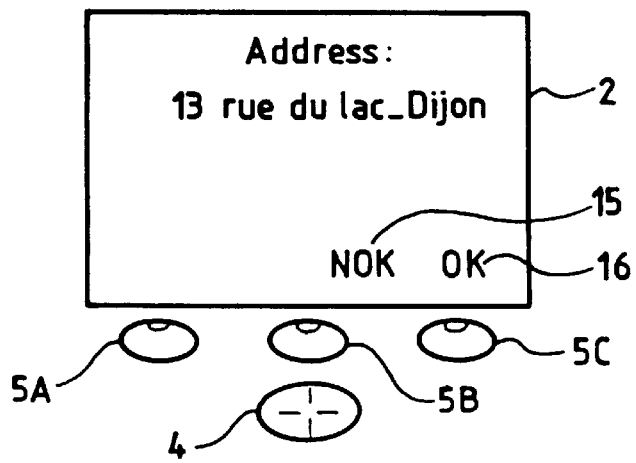
FIG_7
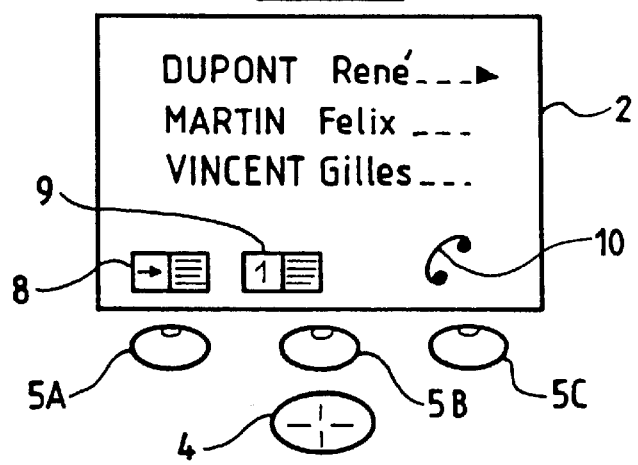
FIG_8

RADIO COMMUNICATION DEVICE PROGRAMMED FOR AUTOMATIC ENTRY OF DIRECTORY DATA

BACKGROUND OF THE INVENTION

The services available on GSM networks include a Short Message Service (SMS) for sending to a mobile telephone a short message consisting of a succession of alphanumeric characters, typically 160 alphanumeric characters. The short messages are usually stored temporarily in a server until the addressee is in a position to receive them. As soon as the mobile telephone to which the short message(s) are addressed makes itself known, for example by logging onto the GSM network when it is switched on, the network advises the short message server that it can deliver the message(s) to their addressee. Operators use these short messages to support services they are developing. This is the case with the directory service in particular, which is used to obtain the telephone coordinates of a subscriber. The short message can include the name of the subscriber, their address and their telephone number, for example.

Radio communication devices of the mobile telephone type usually have a display screen, a keypad, a memory for temporarily storing one or more SMS messages received by radio and a processor programmed to work with the keys of the keypad, the memory and the display screen to display SMS messages stored in the memory on the screen in response to pressing at least one key.

Some mobile telephones also offer the facility to enter data to be stored in a structured form in the memory. This can in particular be data of a directory of telephone numbers and/or addresses. Some devices offer the facility to use more than one directory.

Until now, entering the data of a directory of the above kind has required using the alphanumeric keys of the keypad of the telephone to enter each character. Each key on a mobile telephone keypad is programmed to designate at least three letters and one digit. Consequently, entering a single character may require the same key to be pressed more than once to obtain the required character. Also, entering a complete record of the directory (a directory page) requires a cursor to be moved across the display screen to position it at the beginning of each field of the record. Repetitive pressing of the keys therefore makes entering data irksome and the aim of the invention is to simplify the procedure for entering data to constitute an ordered structure stored in the memory of a radio communication device when the data is already available in that memory, for example in an SMS short message.

OBJECTS AND SUMMARY OF THE INVENTION

The basic idea of the invention is therefore to profit from the presence of a short message in the memory of the radio communication device, in particular a message containing the name, address and telephone number of a subscriber, to create and/or update a directory of telephone numbers and addresses without it being necessary to enter each character of the subscriber's name, address and telephone number.

More particularly, the invention consists in a radio communication device comprising a display screen, a keypad with keys, a first memory adapted to store temporarily a succession of characters received by radio and a processor programmed to work with the keys of the keypad, the first memory and the display screen to display on the screen said succession of characters received by radio, wherein the processor is additionally programmed to respond to pressing at least one key by advancing from an on-screen display of the succession of characters stored in said first memory to an on-screen display for entry of data to be stored in structured form in a second memory, said data entry screen showing said succession of characters stored in said first memory in order to enable processing of at least a portion of that succession of characters as data to be stored in structured form in the second memory.

It is standard practice in SMS short messages for a telephone number to appear between character string separator symbols, in particular standard symbols recognized by the processor, to enable automatic initiation of a call to a number between such symbols. In one particular embodiment of the radio communication device of the invention the keys of the keypad include a soft key which is pressed to move a cursor to the start of a character string identified by a separator symbol and another soft key which is pressed to enter that character string as data to be stored in structured form in the memory. There is therefore no longer any point in moving the cursor to identify the character string to be entered, which further simplifies the entry procedure. If the SMS short message is already structured in the image of the structure of a directory page, in other words if it is made up of a succession of character strings each of which is between character string separator symbols, and if these strings are ordered like the records of a directory page, the entire directory page can be entered either automatically or by pressing a single key. In a variant of this embodiment, the character string separator symbol could be replaced by a record field identifier.

It is to be understood that the invention is not limited to the entry of data to constitute a directory of subscribers' telephone numbers and/or addresses. It encompasses any other type of ordered data structure, for example an appointment diary.

BRIEF DESCRIPTION OF THE DRAWINGS

The following description, illustrated by the drawings, provides a better understanding of the invention.

FIG. 1 is a diagrammatic representation of a radio communication device having a keypad and a display screen.

FIG. 2 shows the on-screen display of an SMS short message received by the radio communication device.

FIG. 3 shows the on-screen display of a telephone number and address directory.

FIG. 4 shows the on-screen display for entering data of a directory page, the data entry screen showing an SMS short message.

FIG. 5 shows the on-screen display of confirmation of data entered to constitute a directory.

FIG. 6 shows another on-screen display of entry of data of a directory page, the data entry screen showing an SMS short message.

FIG. 7 shows another on-screen display of confirmation of data entered to constitute a directory.

FIG. 8 shows the on-screen display of the directory after the entry of data.

MORE DETAILED DESCRIPTION

FIG. 1 shows a radio communication device such as a cellular mobile telephone 1 having a display screen 2, which can display several rows and columns of characters, and a keypad 3 with alphanumeric keys. The mobile telephone shown in FIG. 1 also has a navigation key 4 for moving a cursor around the screen and "soft" keys, here three soft keys 5A, 5B and 5C immediately adjacent the bottom edge of the screen.

The device naturally includes a processor (not shown) programmed to function with the display screen, the keys of the keypad and a memory, not shown, which can be a memory chip in the device or on a memory card adapted to be inserted into the device. The device further includes means for sending and receiving SMS short messages by radio.

The processor is programmed to enable SMS short messages received by the device to be displayed on the screen in response to pressing at least one key. In the example shown in FIG. 1, the soft key 5B relates to a pictogram 6 on the screen depicting an envelope. Pressing this soft key initiates on-screen display of SMS short message(s) received by the device.

FIG. 2 shows one example of an SMS short message displayed on the screen 2. The SMS short message SM is structured in the form of three alphanumeric character strings each of which is between character string separator symbols, here the symbols " ". How the syntax of the SMS short message can be exploited for automatic entry of data to be stored in a structured form in the memory is explained below.

In accordance with the invention, the processor is programmed to display on the screen displaying a short message a pictogram 7 related to a soft key, here the key 5B, which is pressed to initiate a data entry procedure and in particular a procedure for entering data of a directory of telephone numbers and/or addresses.

FIG. 3 shows a first screen of the data processing procedure for constituting a directory. The soft key 5A that relates to the pictogram 8 on the data entry screen is programmed so that pressing it calls up an entry screen for a current directory page and the soft key 5B that relates to the pictogram 9 is programmed so that pressing it changes the current directory. Finally, the soft key 5C that relates to the pictogram 10 is programmed so that pressing it sends a call on the basis of the information contained in the current record of the current directory identified by the symbol ▶. The current record in the current directory is changed using the navigation key 4 to scroll through the characters of the current record.

The processor is programmed to respond to pressing the soft key 5A when the on-screen display is as shown in FIG. 3 by calling up a screen for entering a new record of the current directory, shown in FIG. 4.

As shown in FIG. 4, in accordance with the invention, the processor is programmed to show on the first screen for entering a new record (page) of the current directory, in addition to the field of the record to be filled in, the SMS short message received and stored in the memory, this message being the one shown in FIG. 2. The processor is also programmed to enable the start of a character string which is to be entered as data of the record field to be identified by moving the cursor 11 using the navigation key 4 and the soft key 5A which relates to the pictogram 12. The cursor 11 is then moved to the end of the character string to be entered using the navigation key 4, the selected string being shown in reverse video, for example. The character string is then processed as data of the current field of the record by pressing the soft key 5B that relates to the pictogram 13, this record normally being stored in a different memory area to that in which the succession of characters constituting the SMS short message is stored. The processor then calls up a field entry confirmation screen for the current record, shown in FIG. 5. The entry screen shown in FIG. 4 is used to enter a telephone number of the subscriber whose full coordinates are given in the SMS short message, for example. In FIG. 5, pressing the soft key 5B which relates to the pictogram 15 causes the entry procedure to return to the FIG. 4 screen and pressing the soft key SC which relates to the pictogram 16 calls up a new entry screen for another field of a directory page, as shown in FIG. 6, here the field corresponding to the address of the subscriber, followed by an entry confirmation screen shown in FIG. 7. This screen shows the SMS short message with the pictograms of the soft keys indicated above.

Note that the entry procedure in accordance with the invention does not rule out manual entry of data using the keys 3 of the keypad.

On completion of entry of the various fields of a directory page on the basis of the information contained in an SMS short message, the processor continues the entry procedure by displaying the screen shown in FIG. 3, in which the directory page that has been entered is shown as the current record of the current directory.

Turning again to FIG. 4, when the succession of alphanumeric characters constituting the SMS short message contains character string separator symbols, here the symbols 20, the processor can advantageously be programmed so that pressing the soft key SA moves the cursor 11 to the start of each character string between symbols 20 and pressing the soft key 5B causes immediate entry of the character string whose start is identified by the cursor as data of a directory page field. The processor can advantageously be programmed so that successive depressions of the key 5A cause circular displacement of the cursor to the start of the various character strings in succession. This improvement avoids the need to use the navigation key, which simplifies the entry procedure. If the succession of alphanumeric characters constituting the SMS short message has already been structured using character string separator symbols in the image of the structure of a directory page or using record field identifiers instead of character string separator symbols, it may be advantageous to program the processor for automatic processing of all the fields of the page in response to pressing just one key, for example the soft key 5C.

It is to be understood that the above principle of transferring characters of an SMS message received and stored in a first memory of a radio communication device to a directory of telephone numbers and/or addresses stored in a second memory of the radio communication device for subsequent use can be applied to constituting records of an appointment diary or any other form of database. In the case of a cellular mobile telephone, the first memory is generally incorporated into the telephone and the second memory is incorporated into a removable card that is inserted into the telephone, which enables users to retain the resulting directory or appointment diary even if they change their telephone.

What is claimed is:

1. A radio communication device comprising a display screen, a keypad with keys, a first memory adapted to store temporarily a succession of characters received by a radio signal and a processor programmed to work with the keys of the keypad, the first memory and the display screen to display on the screen said succession of characters received by radio, wherein the processor is additionally programmed to respond to pressing at least one key by advancing from an on-screen display of the succession of characters stored in said first memory to an on-screen display for entry of data to be stored in structured form in a second memory, said data entry screen showing said succession of characters stored in said first memory in order to enable processing of said succession of characters as data to be stored in structured form in the second memory, the succession of characters including at least one character string between character string separator symbols recognized by the processor for processing the character string between the separator symbols, wherein said character string is stored in said second memory by the pressing a single key on said keypad.

2. A device according to claim 1, wherein the keys include a first soft key which is pressed to move a cursor on the display screen to the start of said character string and a second soft key which is pressed to enter said character string as data to be stored in structured form in said second memory.

3. A device according to claim 2, wherein the character string separator symbol is a record field identifier.

4. The device claimed in claim 1, wherein the succession of characters is an SMS message.

5. The device according to claim 1, wherein the data to be stored in structured form in the second memory is data of a directory of telephone numbers, addresses and appointment information.

6. A method of processing data in a radio communication device comprising a display screen, a keypad with keys, a first memory, a second memory and a processor programmed to work with the keys of the keypad, the first memory, a second memory and the display screen, the method comprising the following steps:

commanding the processor to store temporarily in said first memory a succession of characters received by radio and to display said succession of characters on the screen, commanding the processor, in response to pressing at least one key, to call up an on-screen display for entering data to be stored in structured form in said second memory, the data entry screen showing said succession of characters stored in said first memory, the succession of characters including at least one character string between character string separator symbols recognized by the processor for processing the character string between the separator symbols, and commanding the processor to process said at least one character string between character string separator symbols as data to be stored in structured form in said second memory by pressing a single key on said keypad.

7. A device according to claim 1, wherein said second memory is an integrated circuit card inserted into said device.

8. A device according to claim 1, wherein said second memory is an integrated circuit chip installed in said device.

* * * * *